US008422831B2

(12) United States Patent
Iwasaki

(10) Patent No.: US 8,422,831 B2
(45) Date of Patent: Apr. 16, 2013

(54) INFORMATION MANAGEMENT APPARATUS, INFORMATION MANAGEMENT METHOD, AND COMPUTER READABLE MEDIUM WHICH DETERMINE SIMILARITIES

(75) Inventor: Masajiro Iwasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1013 days.

(21) Appl. No.: 12/251,729

(22) Filed: Oct. 15, 2008

(65) Prior Publication Data

US 2009/0110293 A1    Apr. 30, 2009

(30) Foreign Application Priority Data

Oct. 25, 2007   (JP) ................. 2007-277763

(51) Int. Cl.
*G06K 9/54* (2006.01)
*G06K 9/60* (2006.01)
*G06K 9/46* (2006.01)
*G06K 9/66* (2006.01)
*G06K 9/48* (2006.01)
*G06K 9/68* (2006.01)
*G06K 9/62* (2006.01)

(52) U.S. Cl.
USPC ........... 382/305; 382/190; 382/195; 382/199; 382/209; 382/218; 382/224; 382/225

(58) Field of Classification Search ................ None
See application file for complete search history.

(56) References Cited

U.S. PATENT DOCUMENTS

| 5,559,901 | A | * | 9/1996 | Lobregt | 382/256 |
| 6,055,334 | A | * | 4/2000 | Kato | 382/190 |
| 6,307,963 | B1 | * | 10/2001 | Nishida et al. | 382/190 |
| 6,446,068 | B1 | * | 9/2002 | Kortge | 1/1 |
| 6,647,139 | B1 | * | 11/2003 | Kunii et al. | 382/159 |

(Continued)

FOREIGN PATENT DOCUMENTS

| JP | 2000-112973 | | 4/2000 |
| JP | 2000-187731 | | 7/2000 |
| JP | 2001-134593 | A | 5/2001 |
| JP | 2007-80210 | | 3/2007 |

OTHER PUBLICATIONS

Yuya Miyamoto, et al., "An improved method to select candidates on metric index VP-tree", 2007, pp. 1-8 (with English Abstract).

(Continued)

*Primary Examiner* — Tom Y Lu
*Assistant Examiner* — Thomas Conway
(74) *Attorney, Agent, or Firm* — Oblon, Spivak, McClelland, Maier & Neustadt, L.L.P.

(57) ABSTRACT

An information management apparatus includes a characteristic-amount management unit managing a characteristic amount; a characteristic-amount association unit maintaining an association with a similar characteristic amount for each of the characteristic amounts; a space index management unit managing a space index for the characteristic amounts managed by the characteristic-amount management unit; a partial space determination unit determining a partial space in the space index to which a first characteristic amount belongs in accordance with a request for retrieving a characteristic amount similar to the first characteristic amount; and a similarity determination unit calculating similarity between the first characteristic amount and a second characteristic amount and between the first characteristic amount and a third characteristic amount associated with the second characteristic amount by the characteristic-amount association unit, and determines which characteristic amounts are similar to the first characteristic amount by comparing the calculated similarity and a predetermined threshold.

26 Claims, 10 Drawing Sheets

U.S. PATENT DOCUMENTS

| | | |
|---|---|---|
| 7,102,786 B2 * | 9/2006 | Takahashi et al. ............. 358/1.9 |
| 7,216,129 B2 * | 5/2007 | Aono et al. ............................ 1/1 |
| 8,077,976 B2 * | 12/2011 | Shiiyama ...................... 382/190 |
| 8,213,679 B2 * | 7/2012 | Yao ............................... 382/103 |
| 2005/0114331 A1 * | 5/2005 | Wang et al. ........................ 707/6 |
| 2007/0171473 A1 | 7/2007 | Iwasaki |
| 2007/0171482 A1 | 7/2007 | Iwasaki |
| 2008/0205756 A1 * | 8/2008 | Kamata et al. ................ 382/173 |

OTHER PUBLICATIONS

Yasuhiro Sato, et al., "Static Indexing on Searching in Chained Neighborhood Points", The Institute of Electronic, Technical Report of IEICE. Information and Communication Engineers, (Jul. 2001), pp. 215-220 (with English Abstract).

* cited by examiner

FIG.2

| IMAGE ID | IMAGE FILE NAME |
|---|---|
| 1 | imageA |
| 2 | imageB |

| IMAGE ID | CHARACTERISTIC AMOUNT |
|---|---|
| 1 | {a1, a2, ···, an} |
| 2 | {b1, b2, ···, bn} |

| IMAGE ID | SIMILAR INFORMATION LIST (SIMILAR IMAGE ID: SIMILARITY) |
|---|---|
| 1 | 2:0.10、 10:0.11、 ··· |
| 2 | 1:0.10、 3:0.11、 ··· |
| 10 | 1:0.11 |

124

| IMAGE ID | SIMILAR IMAGE ID | SIMILARITY |
|---|---|---|
| 1 | 2 | 0.10 |
| 1 | 10 | 0.11 |
| 2 | 1 | 0.10 |
| 2 | 3 | 0.11 |

124

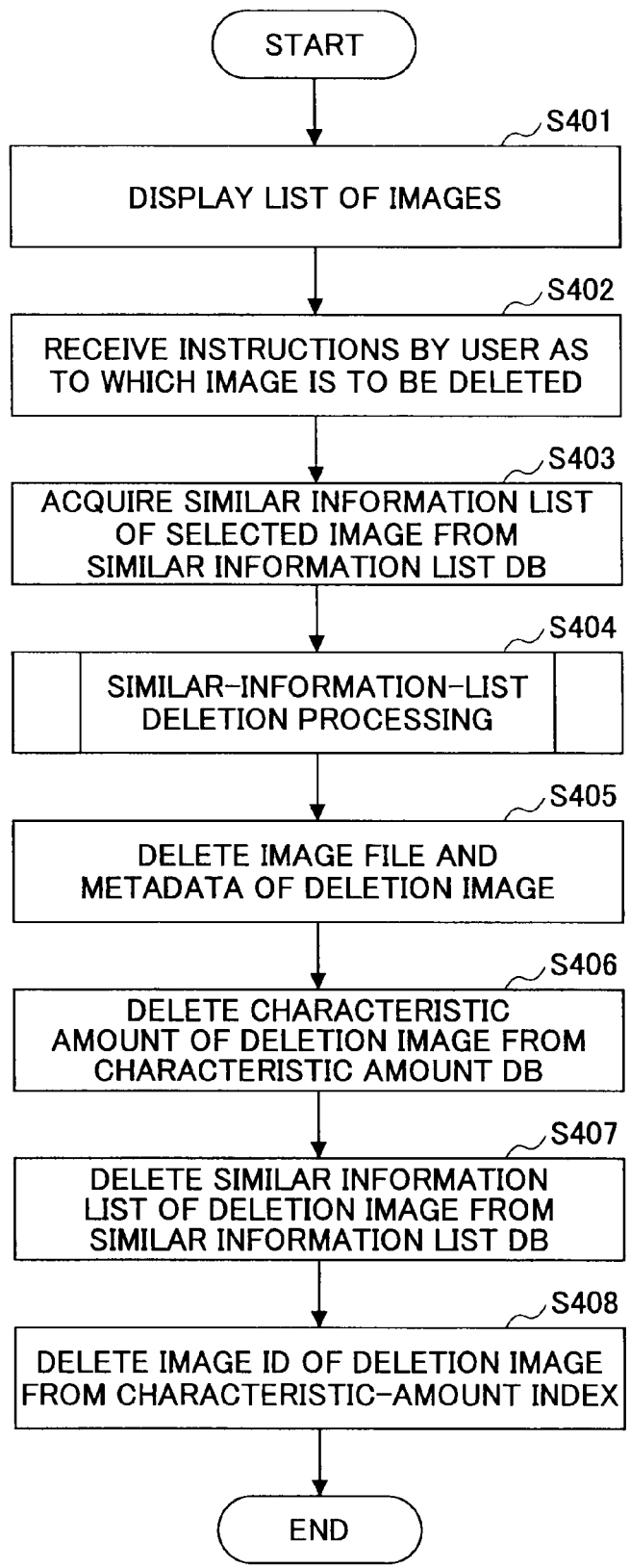

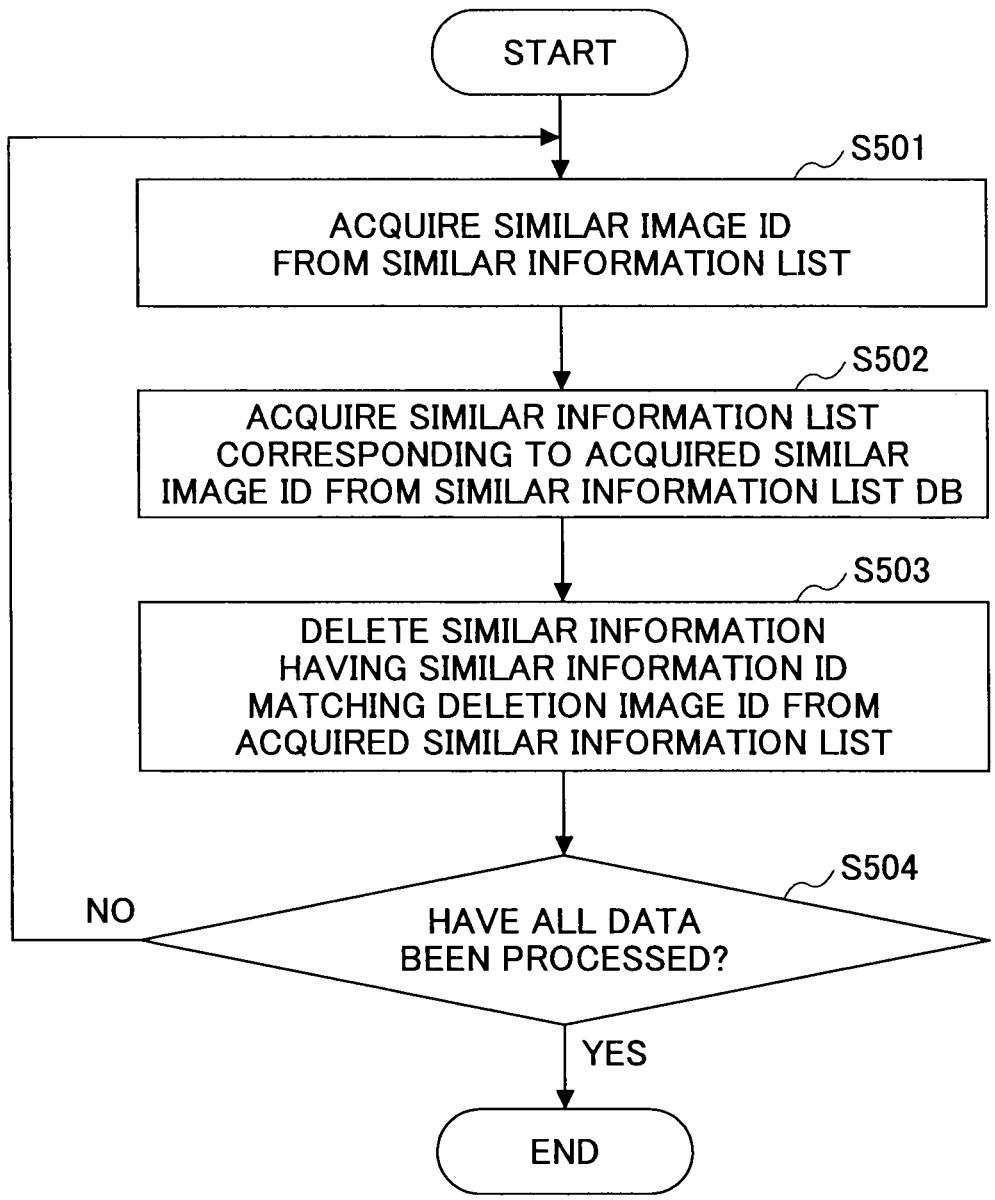

INFORMATION MANAGEMENT APPARATUS, INFORMATION MANAGEMENT METHOD, AND COMPUTER READABLE MEDIUM WHICH DETERMINE SIMILARITIES

BACKGROUND OF THE INVENTION

1. Field of the Invention

The present invention relates to an information management apparatus, an information management method, and a program.

2. Description of the Related Art

In recent years and continuing to the present, techniques of retrieving an image similar to a specific image from an image database using the specific image as a retrieval condition have been proposed and implemented as products.

Generally, in the similar-image retrieval techniques, a characteristic value (hereinafter referred to as a "characteristic amount"), which is obtained by the analysis of an image and serves as information for indicating the characteristic of the image, is registered at the same time as when the image is registered. In retrieving a similar image, the similarity between the characteristic amounts is calculated. If the similarity is greater than a predetermined threshold, an image corresponding to the characteristic amount is retrieved as the similar image.

As a method for extracting a characteristic amount, Patent Document 1, for example, proposes a characteristic-amount extraction technique that enables the automatic extraction of the characteristic amount corresponding to a human sense so that a human can retrieve a similar image adapted to his or her sense of similarity.

In such a similar-image retrieval technique using the characteristic amount, the characteristic amount itself is extracted in advance and stored at the time of registering an image, and a similar image can be retrieved only by the characteristic amount without reference to the image. Therefore, the retrieval of similar-image information can be executed at relatively high speed.

However, the similar-image retrieval technique described above is required to calculate the similarity between the characteristic amount and characteristic amounts of all registration images point by point at the time of retrieving the similar image. Unfortunately, processing speed for retrieving the similar image decreases as the number of registration images is increased.

In order to deal with this problem, Patent Document 2 proposes a technique in which a list of images similar to an image is retrieved in advance from an image database at the time of registering the image and is stored, and the list is used at the time of retrieving a similar image. This technique does not require the processing for calculating the similarity at the time of retrieving the similar image, which in turn can accelerate the processing for retrieving the similar image even where the number of registration images is increased.

Patent Document 1: JP-A-2000-187731

Patent Document 2: JP-A-2007-80210

The technique described in Patent Document 2 makes it possible to retrieve an image similar to a previously accumulated image at high speed, but it is not targeted for retrieving an image similar to a non-accumulated image.

SUMMARY OF THE INVENTION

The present invention has been made in view of the above problems and may provide an information management apparatus, an information management method, and a program capable of appropriately accelerating the retrieval of similar information.

In order to solve the above problems, there is provided an information management apparatus including a characteristic-amount management unit that manages a characteristic amount for each piece of information; a characteristic-amount association unit that maintains an association with a similar characteristic amount among characteristic amounts managed by the characteristic-amount management unit for each of the characteristic amounts; a space index management unit that manages a space index for the characteristic amounts managed by the characteristic-amount management unit; a partial space determination unit that determines a partial space in the space index to which a first characteristic amount belongs in accordance with a request for retrieving a characteristic amount similar to the first characteristic amount; and a similarity determination unit that calculates similarity between the first characteristic amount and a second characteristic amount other than the first characteristic amount belonging to the partial space and between the first characteristic amount and a third characteristic amount associated with the second characteristic amount by the characteristic-amount association unit, and determines which characteristic amounts are similar to the first characteristic amount based on a comparison between the calculated similarity and a predetermined threshold.

With this information management apparatus, it is possible to appropriately accelerate the retrieval of similar information.

According to an embodiment of the present invention, it is possible to provide an information management apparatus, an information management method, and a program capable of appropriately accelerating the retrieval of similar information.

Other objects, features and advantages of the present invention will become more apparent from the following detailed description when read in conjunction with the accompanying drawings.

BRIEF DESCRIPTION OF THE DRAWINGS

FIG. 2 shows an example of the data structure of a metadata DB;

FIG. 3 shows an example of the data structure of a characteristic-amount DB;

FIG. 4 shows an example of the data structure of a similar-information list DB;

FIG. 12 is a flowchart for explaining deletion processing; and

FIG. 13 is a flowchart for explaining similar-information-list deletion processing.

DETAILED DESCRIPTION OF THE PREFERRED EMBODIMENTS

Referring to the accompanying drawings, an embodiment of the present invention is described below. As an example for describing the embodiment, the present invention is applied to similar-image retrieval processing in which image information is registered as information and an image similar to the image information is retrieved. Note that information to be handled is not limited to image information, but it may be of any information so long as its characteristic amount is used to make a comparison to retrieve similar information. For example, the present invention may be applied to the management of document data, voice data, moving-image data, analysis data of information output after being analyzed, etc.

Figure 1:
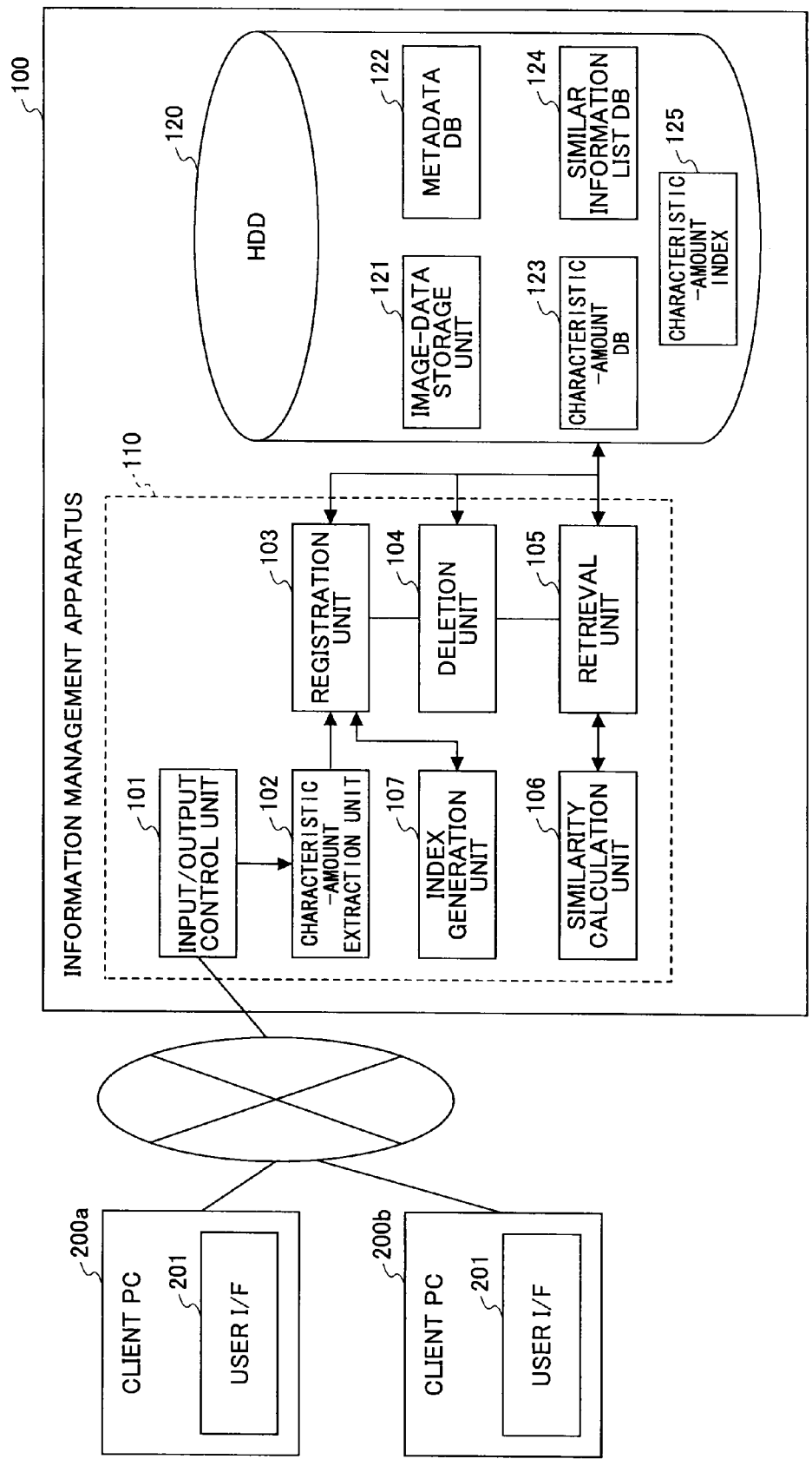
FIG. 1 is a block diagram showing a function configuration example of an information management apparatus according to an embodiment of the present invention.

FIG. 1 is a block diagram showing a function configuration example of an information management apparatus according to the embodiment of the present invention. In FIG. 1, an information management apparatus 100 is connected to plural client PCs (Personal Computers) 200a and 200b (hereinafter simply referred to as a "client PC"), each having a user I/F 201 for inputting retrieval conditions and displaying retrieval results, via networks (regardless of whether they are wired or wireless) such as the Internet or a LAN (Local Area Network).

The information management apparatus 100 has a HDD (hard disk drive) 120 as main hardware. In addition, the information management apparatus 100 has an input/output control unit 101, a characteristic-amount extraction unit 102, a registration unit 103, a deletion unit 104, a retrieval unit 105, a similarity calculation unit 106, and an index generation unit 107 as main software programs. Each of these units is loaded on a RAM 110 and causes a CPU (not shown) to execute processing for implementing its function.

The HDD 120 stores an image-data storage unit 121, a metadata DB (Data Base) 122, a characteristic-amount DB 123, a similar-information list DB 124, and a characteristic-amount index 125. Note that the storage unit is not limited to a HDD, but it may be of any known types such as an optical disk and a memory card.

The image-data storage unit 121 stores image data. In order to store image data, any known methods may be employed; the image data may be stored on a file system provided by an OS (Operating system) or stored on an image database in which the image data are stored.

The metadata DB 122 stores metadata representing attributes of image data. FIG. 2 shows an example of the data structure of the metadata DB 122. As shown in FIG. 2, the metadata DB 122 stores image IDs and image file names as examples of the metadata of image data so as to be associated with each other.

Note that the metadata are not limited to the image file names, but they may be of any information so long as they represent the attributes of image data.

The image file names are used to identify which part of the image-data storage unit 121 images are stored. Note that image data may be stored in an external system and the image file names may contain information for identifying the external system. For example, in order to manage image information stored in the external system, the image data may be stored in an external server on the Internet and the image file names may be represented by a URL (Uniform Resource Locator).

The characteristic-amount DB 123 stores the characteristic amounts of images stored in the image-data storage unit 121. FIG. 3 shows an example of the data structure of the characteristic-amount DB 123. As shown in FIG. 3, the characteristic-amount DB 123 stores image IDs and the characteristic amounts of the images so as to be associated with each other.

As examples of the characteristic amounts of images, vector data such as the color histogram of the images are available. FIG. 3 shows a case in which the vector data as the characteristic amount of the image identified as "image ID=1" are represented by [a1, a2, . . . , an] and the vector data as the characteristic amount of the image identified as "image ID=2" are represented by [b1, b2, . . . , bn]. Note that as the characteristic amounts of images, any known characteristic amounts such as coloring, color distribution, composition, and patterns can be stored. Note that the characteristic amounts are not necessarily different in form from original information (images in the embodiment). If it is possible to determine the similarity between images with the original information, the original information itself may be handled as the characteristic amounts.

The similar-information list DB 124 stores similar information whose characteristic amounts are determined to be similar to each other among images stored in the image data storage unit 121. FIG. 4 shows an example of the data structure of the similar-information list DB 124. As shown in FIG. 4, the similar-information list DB 124 stores image IDs and similar-information lists that include at least a group of similar image IDs as the image IDs of similar images and the similarity, so as to be associated with each other. A method for calculating the similarity is described below.

Figures 5, 6:
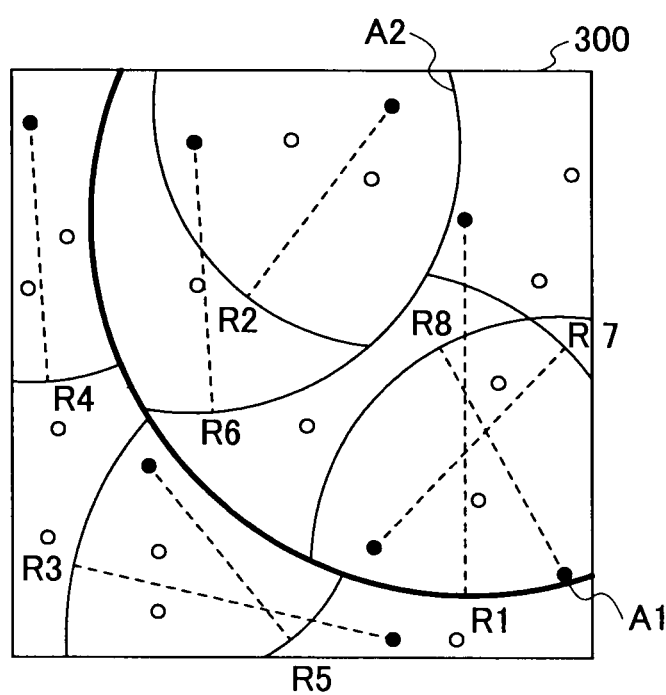
FIG. 5 shows another example of the data structure of the similar-information list DB.
FIG. 6 shows a division example of a characteristic-amount space based on the VP-tree (Vantage Point tree)

FIG. 5 shows another example of the data structure of the similar-information list DB 124. As shown in FIG. 5, the similar-information list DB 124 stores image IDs, similar image IDs, and the similarity so as to be associated with each other. Even if the similar-information list DB 124 is configured in this manner, it can store plural similar information for one image.

Note that in this case, information, which includes at least a group of the similar image ID and the similarity each associated with the same image ID, corresponds to the similar-information list according to the embodiment. In the example of FIG. 5, the similar-information list associated with "image ID=1" is the information that includes a group of 2 for the similar image ID and 0.10 for the similarity and a group of 10 for the similar image ID and 0.11 for the similarity.

Once similar information is registered in advance in the similar-information list DB 124, it is not necessary to calculate the similarity between characteristic amounts to retrieve the similar information at the time of retrieving a similar image, thereby making it possible to accelerate retrieval processing.

The characteristic-amount index 125 is a space index that classifies characteristic amounts included in the characteristic-amount DB 123 into pieces. The characteristic amounts are classified by the division of a vector space (characteristic-amount space) of the characteristic amounts. For example, FIG. 6 shows a division example of the characteristic-amount space based on the VP-tree (Vantage Point tree).

FIG. 6 shows a characteristic-amount space 300 in two dimensions (Note that it is actually multidimensional). In FIG. 6, respective points represent characteristic amounts. Arcs represent boundary lines by which the characteristic-amount space 300 is divided. In the division of the characteristic-amount space 300, the number of the characteristic amounts is divided in half. For example, the characteristic-amount space 300 is divided into two pieces of partial spaces by an arc A1. Then, one of the partial spaces divided by the arc A1 is further divided in half by an arc A2. Through the repetition of such a division, the partial spaces shown in FIG. 6 are formed. Note that in the characteristic-amount space 300, the similarity between two characteristic amounts corresponds to the distance between them.

The relationship between the partial spaces and the characteristic amounts shown in FIG. 6 can be represented by a tree structure (binary tree). Information representing this tree structure corresponds to the characteristic-amount index 125.

Figure 7:
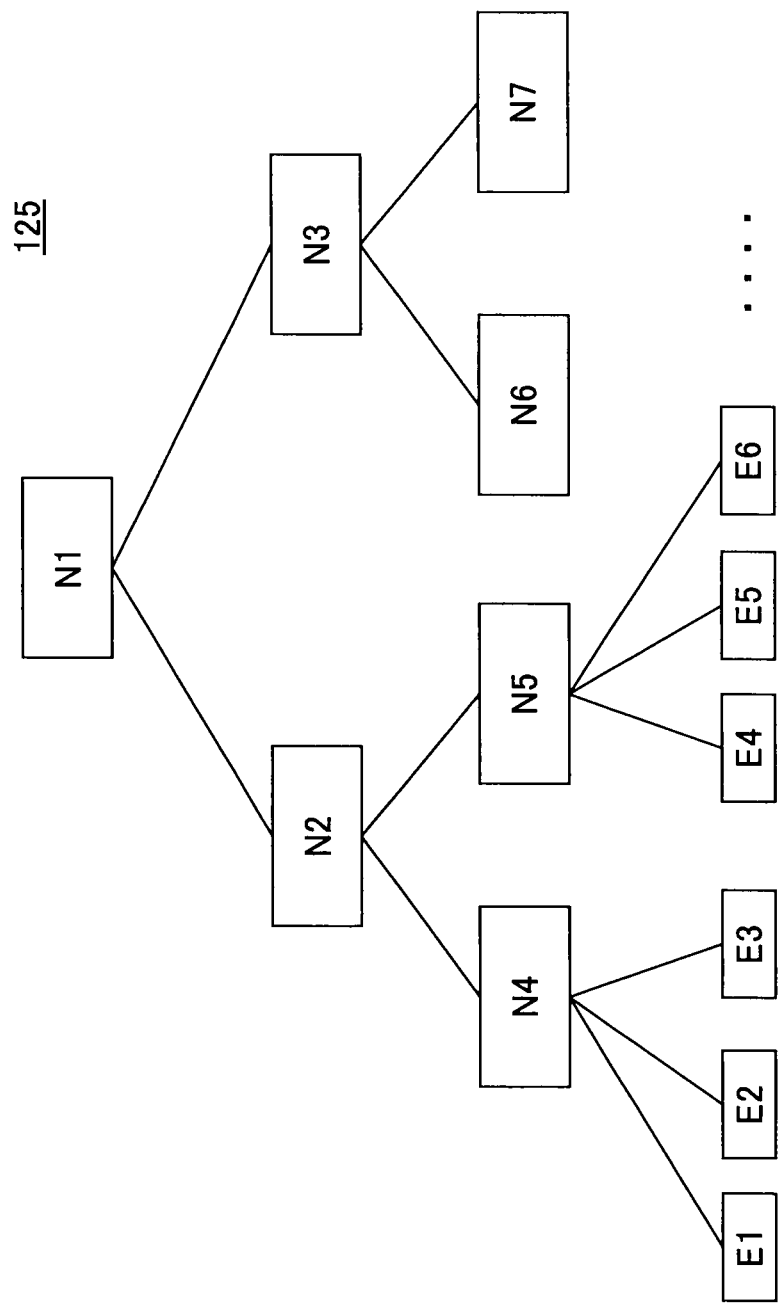
FIG. 7 shows a configuration example of a characteristic-amount index.

FIG. 7 shows a configuration example of the characteristic-amount index 125. In FIG. 7, nodes Nn (n is a positive integer) represent the characteristic-amount spaces, and nodes En (n is a positive integer) represent the characteristic amounts. Assume that a node N1 is the characteristic-amount space 300 in FIG. 6, and nodes N2 and N3 represent the partial spaces divided by the arc A1. In addition, nodes N4 and N5 represent the partial spaces divided by the arc A2. Note, however, that FIG. 7 does not conform to FIG. 6 in every respect.

Among the nodes corresponding to the partial spaces in such a tree structure, terminal nodes are the partial spaces of a minimum unit. In other words, the partial spaces of the minimum unit have only one partial space. As shown in FIG. 7, the nodes En representing the characteristic amounts belong to the nodes as the partial spaces of the minimum unit. Note that the term just described as the "partial space" in the following description refers to the partial space of the minimum unit.

By tracing the tree structure, the characteristic-amount index 125 configured by such information can reduce a calculation amount required for searching for the partial space to which a certain characteristic amount belongs. This is based on the same principle as general binary-tree search methods.

The input/output control unit 101 controls input processing for registering and retrieving images specified by the user via the client PC and processing for outputting retrieval results to the client PC.

The characteristic-amount extraction unit 102 extracts the characteristic amount from image data. As a method for extracting the characteristic amount, any known methods including one described in Patent Document 1 in which the histogram of a color is extracted as the characteristic amount can be employed. Note that when original information is handled as the characteristic amount itself, the characteristic-amount extraction unit 102 is not required.

The registration unit 103 executes, in response to a request for registering image data, processing for registering the data in the image-data storage unit 121, the metadata DB 122, the characteristic-amount DB 123, the similar-information list DB 124, and the characteristic-amount index 125.

The deletion unit 104 executes, in response to a request for deleting image data, processing for deleting the data from the image-data storage unit 121, the metadata DB 122, the characteristic-amount DB 123, the similar-information list DB 124, and the characteristic-amount index 125.

The similarity calculation unit 106 compares the characteristic amount of information to be registered, which is extracted by the characteristic-amount extraction unit 102, with that of existing information registered in the characteristic DB 123, and calculates the similarity for indicating to what extent they are similar to each other.

For example, assume that the vector data of the characteristic amounts to be compared are [a1, a2, . . . , an] and [b1, b2, . . . , bn], the similarity calculation unit 106 calculates the similarity S based on the following formula (1).

$$S = \Sigma |a_i - b_i| \quad (1)$$

The similarity S is calculated based on the sum of the absolute values of differences between the components of the vector data of the characteristic amounts. Therefore, the smaller the similarity S is, the higher the similarity between the characteristic amounts becomes.

The elements of the vector data are generally expressed in the form of floating points. Furthermore, the vector data as the characteristic amounts of image data are generally data of one hundred dimensions through two hundred dimensions, and their data size are 1.5 k through 2.0 k bytes. Accordingly, processing for calculating the similarity expressed by the above formula (1) is arithmetic processing that causes a heavy load.

The index generation unit 107 updates the characteristic-amount index 125 based on the characteristic amounts of image data at the time of registering the image data.

The retrieval unit 105 mainly retrieves characteristic amounts similar to the characteristic amount of image data serving as a seed for retrieval (retrieval conditions) using the characteristic-amount index 125 and the similar-information list DB 124. In addition, the retrieval unit 105 retrieves data concerning image data according to retrieved characteristic amounts from the image-data storage unit 121, the metadata DB 122, etc., as occasion demands.

Next, a processing procedure in the information management apparatus 100 is described, starting from similar-image retrieval processing. In describing the retrieval processing, FIG. 8 is first used.

Figure 8:
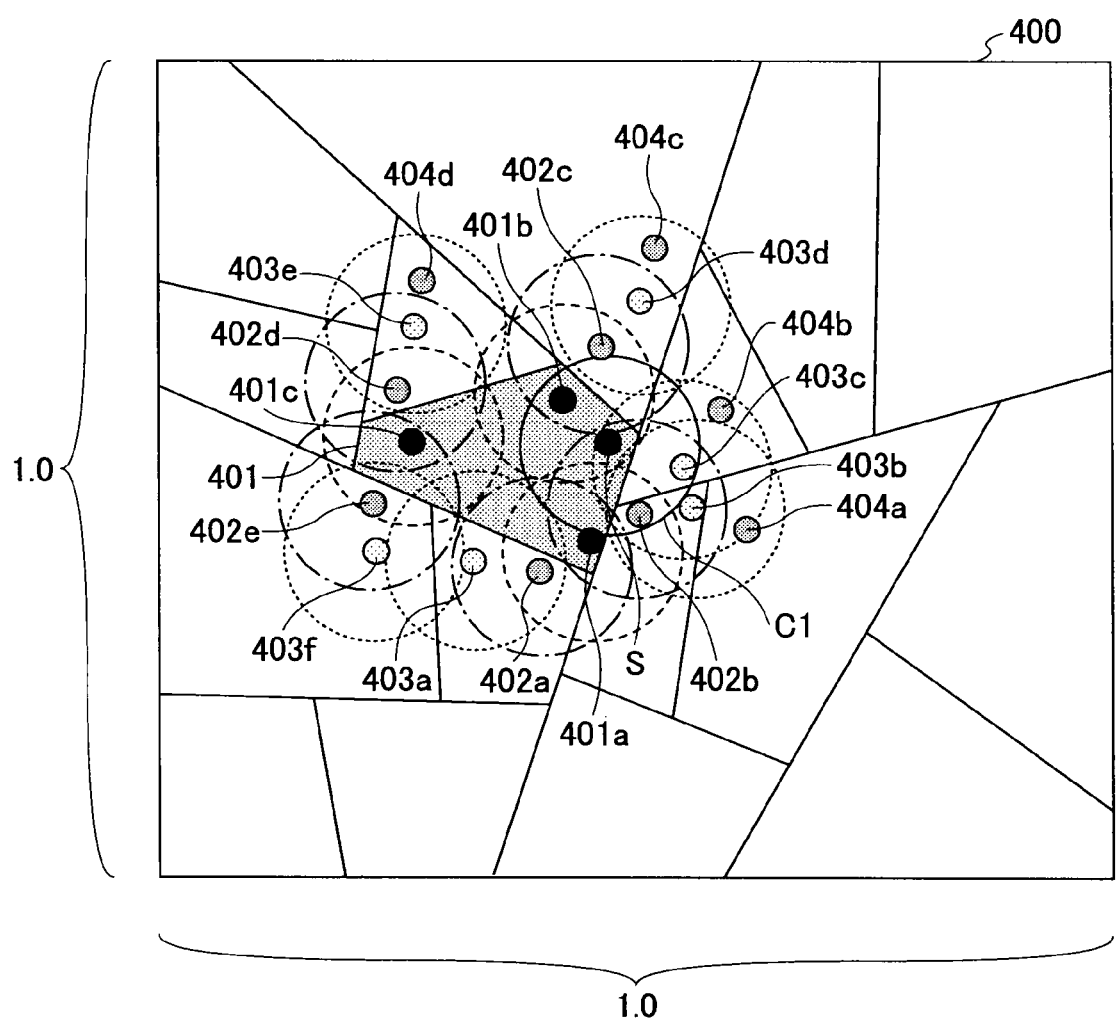
FIG. 8 illustrates similar-image retrieval processing on a conceptual basis.

FIG. 8 illustrates the similar-image retrieval processing on a conceptual basis. In FIG. 8, a rectangle denoted by reference numeral 400 shows the characteristic-amount space in the characteristic-amount index 125, which is expressed on a two-dimensional space. Note that FIG. 8 is different from FIG. 6 in that partial spaces are divided by straight lines, but it is for the sake of convenience. In FIG. 8, a point S represents the characteristic amount (hereinafter referred to as a "characteristic amount S") of image data (serving as a seed for retrieval) (hereinafter referred to as a "seed image") provided as a retrieval condition. Points other than the characteristic amount S represent the characteristic amounts classified into the partial spaces in the characteristic-amount index 125. A circle c1 shown by a solid line located around the point S is a retrieval circle formed based on the similarity (hereinafter referred to as a "similarity condition") provided as the retrieval condition. In other words, FIG. 8 illustrates an example for searching for (retrieving) a characteristic amount included in the retrieval circle c1. Note, for example, that when the width of the characteristic-amount space 400 is "1.0" and the height thereof is "1.0," a value specified as the similarity condition could be greater than 0 and smaller than 1.0. For example, when the value "0.2" is provided as the similarity condition, the retrieval circle c1 has a radius of 0.2.

In retrieving the characteristic amount included in the retrieval circle c1, the information management apparatus 100 first specifies a partial space 401 to which the characteristic amount S belongs using the characteristic-amount index 125. Then, the information management apparatus 100 calculates the similarity (distance) between the characteristic amount S and each of characteristic amounts 401a, 401b, and 401c (hereinafter referred to as "characteristic amounts 401" when they are collectively named) included in the partial space 401, and determines whether they exist in the retrieval circle c1. In other words, the information management apparatus 100 determines whether each of the characteristic amounts 401 exists in the retrieval circle c1 using the calculated similarity and the similarity provided as the retrieval condition. The information management apparatus 100 holds the image ID and the similarity corresponding to the characteristic amount (characteristic amount 401b in FIG. 8) existing in the retrieval circle c1 as a retrieval result.

Meanwhile, although the partial space 401 to which the characteristic amount S belongs can be specified at high speed based on the characteristic-amount index 125, the range of the retrieval circle c1 straddles partial spaces other than the partial space 401. Accordingly, the characteristic amount included in the retrieval circle c1 (i.e., characteristic amount satisfying the retrieval condition) could exist even in the partial spaces other than the partial space 401. Therefore, there is a high possibility that a retrieval result at this moment includes retrieval omissions. In order to deal with this problem, the information management apparatus 100 performs the following processing to retrieve the characteristic amount included in the retrieval circle c1 from among those belonging to other partial spaces with a least calculation amount.

The information management apparatus 100 first acquires characteristic amounts included in the similar-information list of the similar-information list DB 124 for each of the characteristic amounts 401. In this processing, in other words, the characteristic amounts included in circles shown by broken lines located around each of the characteristic amounts 401 in FIG. 8 are acquired. Accordingly, characteristic amounts 402a, 402b, 402c, 402d, and 402e (hereinafter referred to as "characteristic amounts 402" when they are collectively named) are acquired. Note that the information management apparatus 100 may acquire only the characteristic amounts whose associated similarity is smaller than or equal to the similarity (0.2 in the embodiment) provided as the retrieval condition instead of acquiring all the characteristic amounts included in the similar-information list. Such a configuration can attain the acceleration of processing speed.

The information management apparatus 100 calculates the similarity between the characteristic amount S and each of the characteristic amounts 402, and determines whether they exist in the retrieval circle c1. The information management apparatus 100 holds the image ID and the similarity corresponding to the characteristic amount (characteristic amount 402b in FIG. 8) existing in the retrieval circle c1 as a retrieval result.

Next, the information management apparatus 100 also acquires characteristic amounts included in the similar-information list DB 124 corresponding to the characteristic amounts 402. Accordingly, in FIG. 8, characteristic amounts 403a, 403b, 403c, 403d, 403e, and 403f (hereinafter referred to as "characteristic amounts 403" when they are collectively named) included in circles shown by dashed lines located around each of the characteristic amounts 402 are acquired. The information management apparatus 100 calculates the similarity between the characteristic amount S and each of the characteristic amounts 403, and determines whether they exist in the retrieval circle c1. The information management apparatus 100 holds the image ID and the similarity corresponding to the characteristic amount (characteristic amount 403c in FIG. 8) existing in the retrieval circle c1 as a retrieval result.

Then, the information management apparatus 100 also acquires characteristic amounts included in the similar-information list DB 124 corresponding to the characteristic amounts 403. Accordingly, in FIG. 8, characteristic amounts 404a, 404b, 404c, and 404d (hereinafter referred to as "characteristic amounts 404" when they are collectively named) included in circles shown by dotted lines located around each of the characteristic amounts 403 are acquired. The information management apparatus 100 calculates the similarity between the characteristic amount S and each of the characteristic amounts 404, and determines whether they exist in the retrieval circle c1. In this case, no characteristic amounts 404 exist in the retrieval circle c1. Therefore, the information management apparatus 100 ends the similar-image retrieval processing. Accordingly, in the example of FIG. 8, the image IDs and the similarities corresponding to the characteristic amounts 401b, 402b, and 403c are output as a retrieval result.

Thus, the characteristic amounts recursively acquired using the similar-information list are regarded as objects to be determined for calculating the similarity between the characteristic amounts involved and the characteristic amount S. As a result, in partial spaces other than the partial space 401, the characteristic amounts included in other partial spaces adjacent to the partial spaces can also be regarded as the objects to be determined for calculating the similarity between the characteristic amounts involved and the characteristic amount S. Accordingly, it is possible to reduce the number of retrieval omissions and accelerate the retrieval processing.

Figure 9:
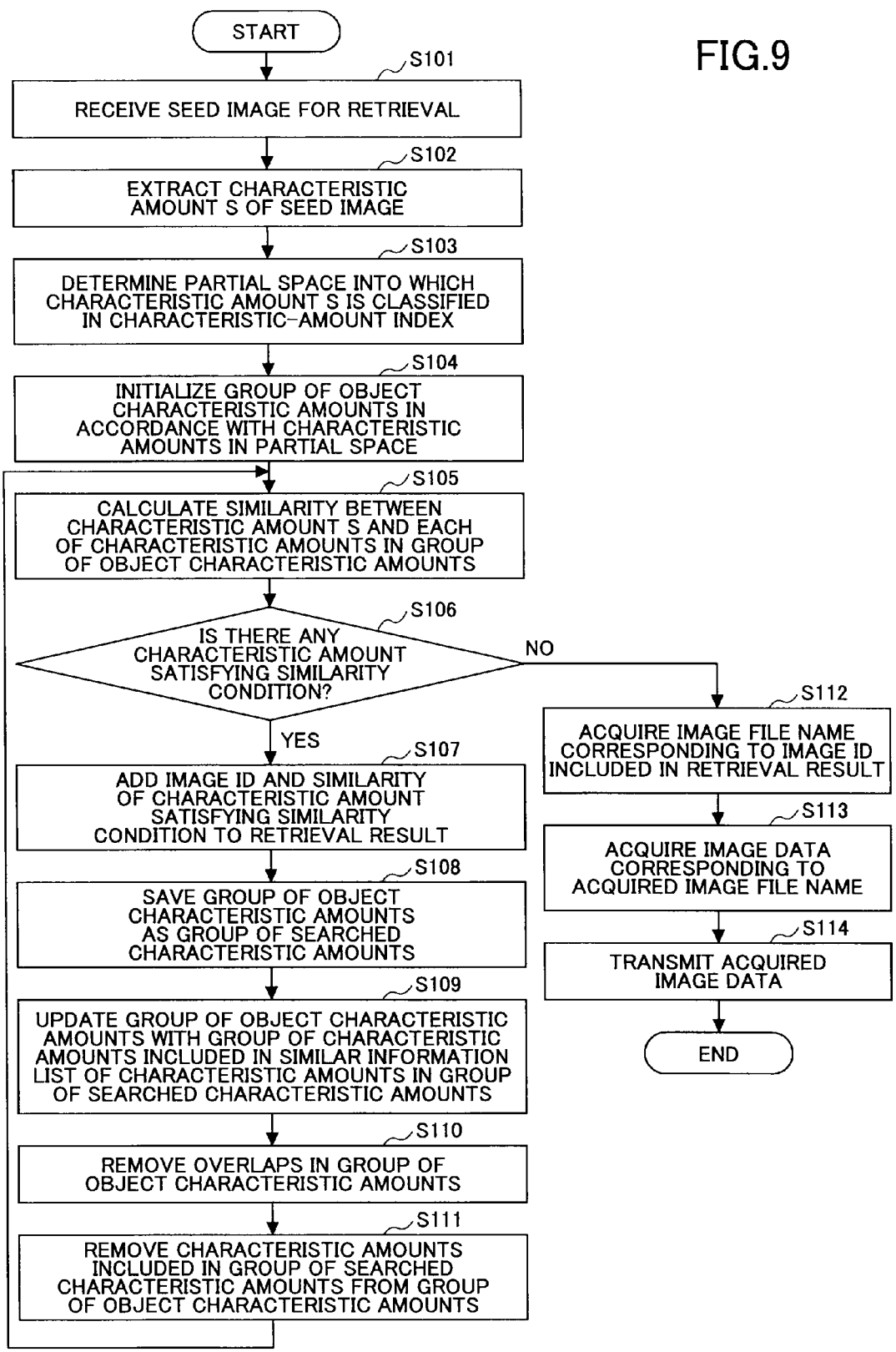
FIG. 9 is the flowchart for explaining the similar-image retrieval processing.

Here, a processing content is specifically described using a flowchart. FIG. 9 is the flowchart for explaining the similar-image retrieval processing.

In step S101, the input/output control unit 101 receives the seed image and the similarity condition from the client PC. The seed image and the similarity condition are specified or input by the user via the user I/F 201. Note, here, that the seed image specified may not be registered in the image management apparatus 100. Furthermore, instead of being received by the client PC, the similarity condition may be set in advance in the HDD 120 of the information management apparatus 100.

Next, the characteristic-amount extraction unit 106 extracts the characteristic amount of the seed image from the seed image (i.e., it generates the characteristic amount of the seed image based on the seed image) (S102). Then, the retrieval unit 105 specifies a partial space into which the characteristic amount S is classified using the characteristic-amount index 125 (i.e., it determines which partial space the characteristic amount S belongs to) (S103).

Next, the retrieval unit 105 acquires image IDs associated with the specified partial space from the characteristic-amount index 125, acquires characteristic amounts corresponding to the image IDs from the characteristic-amount DB 123, and initializes a group of object characteristic amounts (group of image IDs and characteristic amounts regarded as objects to be determined for calculating the similarity between the characteristic amounts involved and the characteristic amount S) with the acquired characteristic amounts and their image IDs (S104).

Then, the similarity calculation unit 106 calculates the similarity (distance) between the characteristic amount S and all the characteristic amounts included in the group of object characteristic amounts (S105). Next, the retrieval unit 105 determines whether the calculated similarity is smaller than or equal to the similarity specified as a similarity condition (S106). If there is any characteristic amount satisfying the similarity condition (Yes in step S106), the retrieval unit 105 adds the image ID and the similarity of the characteristic amount satisfying the similarity condition to a retrieval result (S107).

Then, the retrieval unit 105 saves the group of object characteristic amounts as a group of searched characteristic amounts (S108). The group of searched characteristic amounts comprises the characteristic amounts and their image IDs that have been subjected to the determination for calculating the similarity between the characteristic amounts involved and the characteristic amount S. Next, the retrieval unit 105 acquires the similar-information lists corresponding to the characteristic amounts included in the group of searched characteristic amounts from the similar-information list DB 124 based on the image IDs of the characteristic amounts, acquires the characteristic amounts corresponding to the similar image IDs (image IDs) included in the acquired similar-information lists from the characteristic-amount DB 123, and updates the group of object characteristic amounts with the acquired characteristic amounts and their image IDs (S109).

Then, the retrieval unit 105 removes overlaps in the group of object characteristic amounts (S110). This is because if there is any characteristic amount overlapped in plural similar-information lists, two or more of the same characteristic amounts exist in the group of object characteristic amounts. The removal of the overlaps prevents unnecessary calculation of the characteristic amounts: the same characteristic amounts are not allowed to be used repeatedly for calculating the similarity between the characteristic amounts involved and the characteristic amount S.

Next, the retrieval unit 105 removes the characteristic amounts and their image IDs included in the group of searched characteristic amounts from the group of object characteristic amounts (S111). This prevents unnecessary calculation of the characteristic amounts: the characteristic amounts, which have been determined to calculate the similarity between the characteristic amounts involved and the characteristic amount S, are not allowed to be used repeatedly for calculating the similarity.

Then, the processing steps after S105 are executed based on a group of new object characteristic amounts. In other words, the characteristic amounts included in the similar-information lists are recursively determined to calculate the similarity and determined to find whether the characteristic amounts satisfy the similarity condition.

If there is no characteristic amount satisfying the similarity condition among those included in the group of object characteristic amounts during the recursive processing (No in step S106), the retrieval unit 105 leaves the loop processing (recursive processing).

However, the end condition for the loop processing is not limited to this. For example, the retrieval unit 105 may leave the loop processing after conducting the processing steps of S107 through S111 only once. In this case, determination objects for calculating the similarity are the characteristic amounts belonging to the same partial space as the characteristic amount S and other characteristic amounts similar to the characteristic amounts. Furthermore, the retrieval unit 105 may just leave the loop processing when the number of repeated processing times reaches a prescribed value. In this case, there is a high possibility of omissions in a retrieval result, but high-speed retrieval is possible. Furthermore, the retrieval unit 105 may leave the loop processing when a status where no characteristic amount exists in the similarity condition (retrieval circle) reaches a prescribed number of times or is continued for a predetermined number of times. As a result, it is possible to reduce the possibility of retrieval omissions and perform the retrieval processing at a constant high speed.

Next, the retrieval unit 105 acquires the image file name corresponding to the image ID included in the retrieval result from the metadata DB 122 (S112). Then, the retrieval unit 105 acquires the image data corresponding to the acquired image file name from the image-data storage unit 121 and sorts the acquired image data based on the similarity (S113). Note that when image data are stored in an external system, the retrieval unit 105 acquires image data corresponding to the image file name from the external system. Next, the input/output control unit 101 transmits the acquired image data to the user I/F 201 of the client PC (S114). The user I/F 201 of the client PC displays the received image data on a display unit. Note that in step S114, a list of metadata (image file names) may be transmitted to the user I/F 201 instead of the image data. In this case, the list of the metadata is displayed on the client PC. The input/output control unit 101 may transmit image data selected from the list to the client PC.

As described above, the information management apparatus 100 according to the embodiment specifies the partial space in the space index to which the seed image belongs, and regards the characteristic amounts belonging to the partial space and other characteristic amounts similar to the characteristic amounts as objects to be determined for calculating the similarity between the characteristic amounts involved and the seed image. Accordingly, compared with a case in which all the characteristic amounts registered in the characteristic-amount DB 123 are regarded as objects to be determined for calculating the similarity, it is possible to greatly reduce a calculation amount. The degree of reduction in the calculation amount differs depending on accumulated characteristic amounts and the number of dimensions of the characteristic amounts. However, in consideration of a fact in which the characteristic amounts of image data are generally data of one hundred dimensions through two hundred dimensions, such a degree is remarkable. Accordingly, the information management apparatus 100 can accelerate the similar-image retrieval processing for an unregistered seed image.

Furthermore, the information management apparatus 100 also calculates the similarity between the seed image and the characteristic amounts recursively acquired based on the similar-information lists and determines as to whether the characteristic amounts satisfy the similarity condition. Accordingly, even if the range of the similarity condition (retrieval circle) straddles partial spaces, it is possible to reduce the number of retrieval omissions.

Note that the form of the space index (characteristic-amount index 125) is not limited to a predetermined one. Besides the VP-tree described above, various known space indexes based on the R-tree, the M-tree index, etc., can be employed.

In other words, simply by specifying the partial space in the space index of any form into which the characteristic amount of the seed image is classified, it is possible to calculate the similarity between the seed image and the characteristic amounts included in the partial space and between the seed image and other characteristic amounts included in the similar-information lists of the characteristic amounts, thereby making a determination as to whether the characteristic amounts involved satisfy the similarity condition.

However, in the case of the space index based on the M-tree, partial spaces are overlapped with each other. Accordingly, a plurality of the partial spaces, into which the characteristic amount of the seed image is classified, could exist. In this case, however, it is only necessary to execute the processing described in FIG. 9 for the plural partial spaces. Note that the index methods of characteristic amounts are specifically described, for example, in JP-A-2000-112973.

Figure 10:
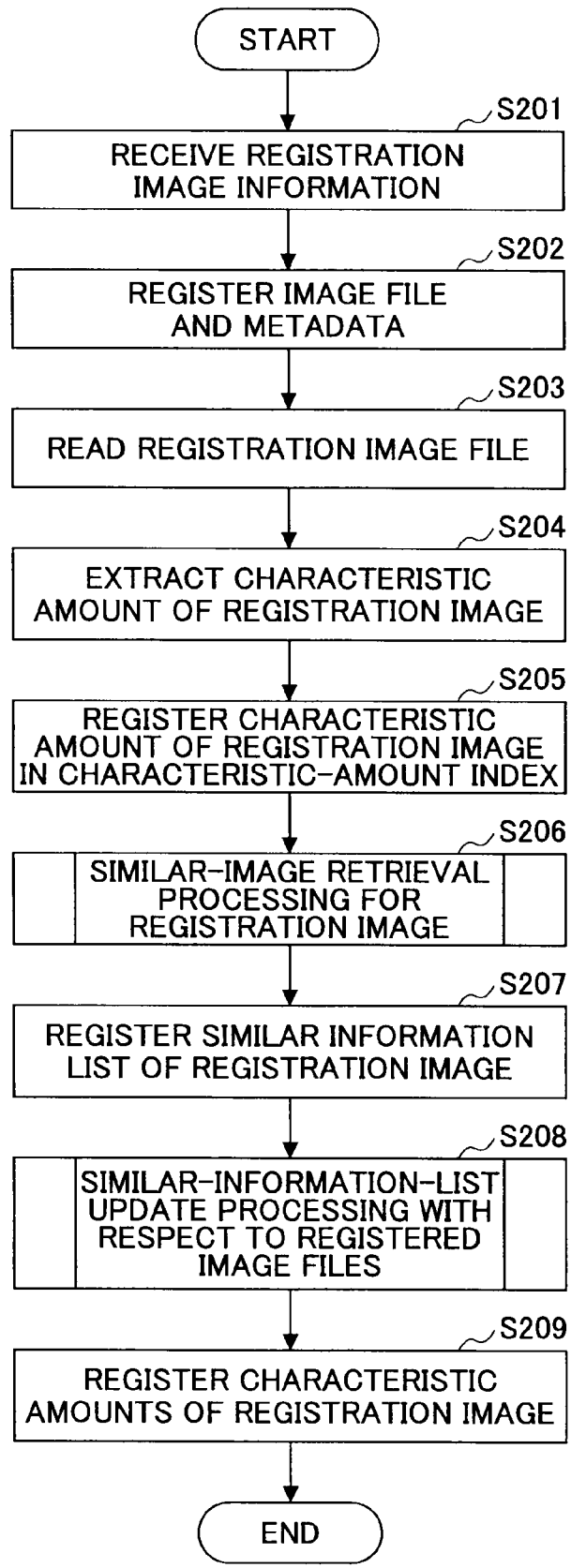
FIG. 10 is a flowchart for explaining image-information registration processing.

Next, a processing procedure at the time of registering image information is described. FIG. 10 is a flowchart for explaining image-information registration processing.

First, the input/output control unit 101 receives a registration image file and its metadata (such as a file name) from the client PC (S201). The registration image file is specified or selected by the user via the user I/F 201 in the client PC. Then, the registration unit 103 stores the registration image file in the image-data storage unit 121 and registers the image ID of the registration image file and the image file name thereof in the metadata DB 122 so as to be associated with each other (S202).

Next, the characteristic-amount extraction unit 102 reads image data (registration image) from the registration image file (S203) and extracts (generates) the characteristic amount of the registration image (S204). The extracted characteristic amount is output as vector data as described above. Then, the index generation unit 107 registers the image ID of the registration image file in the characteristic-amount index 125 based on the characteristic amount of the registration image (S205).

Next, the information management apparatus 100 executes the similar-image retrieval processing for the registration image (S206). This retrieval processing is executed in accordance with the processing steps shown in FIG. 9. Note, here, that the registration image is used as the seed image, and the similarity (for example, 0.3, etc.) set in advance in the HDD 120 is used as the similarity condition.

Then, the registration unit 103 registers a group of the image ID (similar image ID) output by the similarity-image retrieval processing and the similarity in the similar-information list DB 124 as a similar-information list (S207). Next, the information management apparatus 100 executes the similar-information-list update processing with respect to registered image files (S208). The similar-information-list update processing is specifically described below.

Then, the registration unit 103 registers the characteristic amount extracted by the characteristic-amount extraction unit 102 in step S204 in the characteristic-amount DB 123 (S209) and ends the registration processing.

Thus, according to the embodiment, a comparison with all the characteristic amounts is not made in the creation of the similar-information list, but a similar image is retrieved by the similar-image retrieval processing described in FIG. 9. Accordingly, it is possible not only to reduce processing load in the registration processing but also to accelerate the registration processing that involves the creation of the similar-information list.

Note that in the above example, the registration of the image information is executed at the same time as the retrieval of the similar image and the registration of the similar-information list. However, the retrieval of the similar image and the registration of the similar-information list may be executed after the completion of the processing shown in FIG. 10 only before the retrieval processing is executed.

Here, the similar-information-list update processing in step S208 of FIG. 10 is specifically described. Newly-registered image information and its corresponding similar information (existing information) are information items similar to each other. Accordingly, it is necessary to add the newly-registered image information to the similar-information lists of the existing information. This processing is executed in the similar-information-list update processing.

Figure 11:
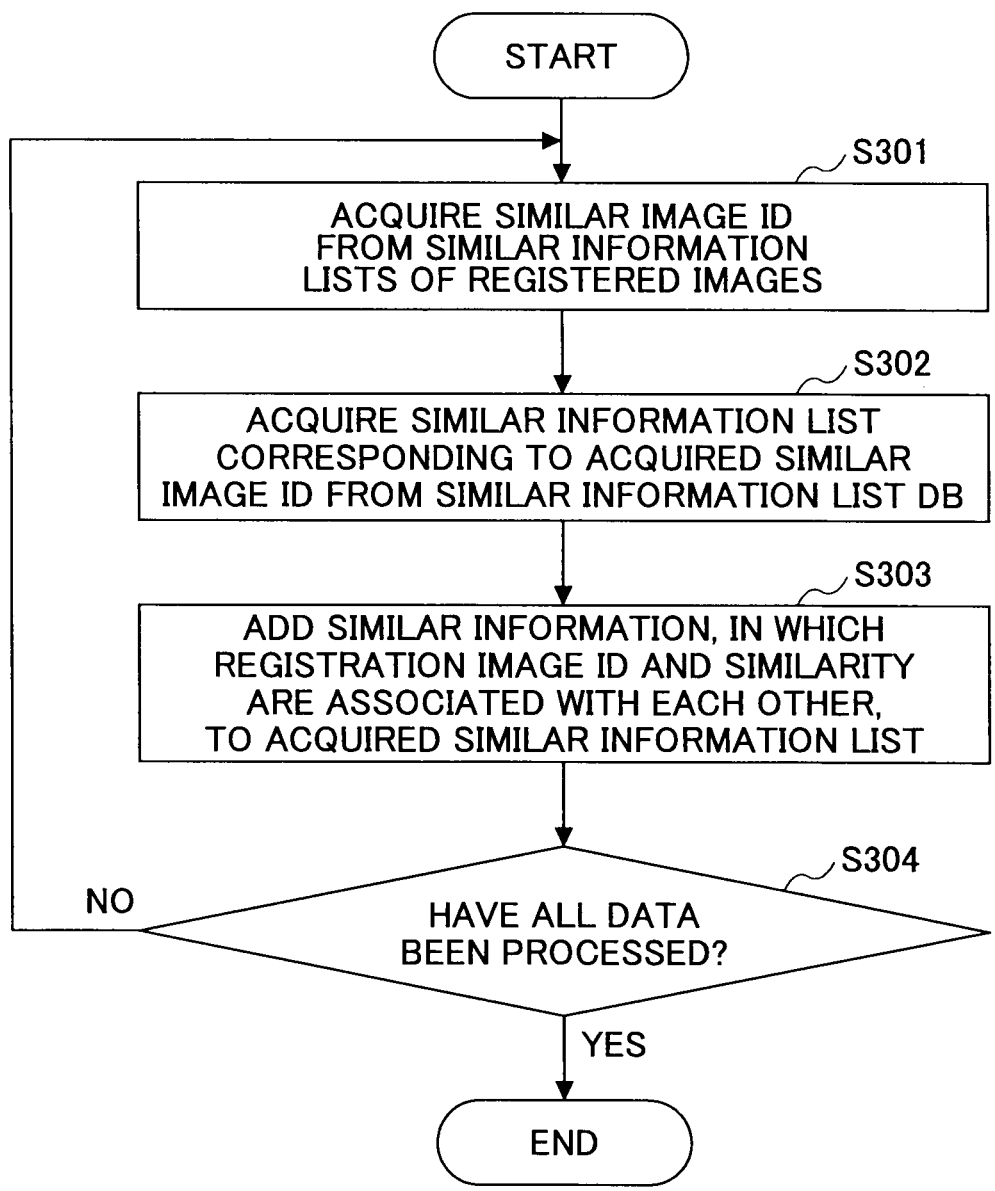
FIG. 11 is a flowchart for explaining similar-information-list update processing.

FIG. 11 is a flowchart for explaining the similar-information-list update processing.

First, the retrieval unit 105 acquires a similar image ID from the similar-information lists of registration images (S301). Next, the retrieval unit 105 acquires a similar-information list corresponding to the acquired similar image ID from the similar-information list DB 124 (S302). Then, the registration unit 103 adds similar information, in which the ID of the image to be registered and the similarity output in step S206 are associated with each other, to the acquired similar-information list (S303).

Next, the retrieval unit 105 determines whether all the data in the similar-information lists of the registration images have been processed (S304). If all the data have not been processed (No in S304), the retrieval unit 305 acquires the next similar image ID and repeats the processing (S301).

If all the data have been processed (Yes in S304), the retrieval unit 105 ends the similar-information-list update processing.

Here, information deletion processing by the information management apparatus 100 is described. FIG. 12 is a flowchart for explaining the deletion processing.

First, the input/output control unit 101 displays a list of image file names registered in the metadata DB 122 on the user I/F 201 of the client PC (S401) and receives instructions from the user as to which image is to be deleted (S402).

Next, the retrieval unit 105 acquires the similar-information list of the image selected by the user from the similar-information list DB 124 (S403).

Then, the retrieval unit 105 executes similar-information-list deletion processing (S404). The similar-information-list deletion processing is specifically described below.

Next, the deletion unit 104 deletes the image file of a deletion image from the image-data storage unit 121 and deletes its metadata from the metadata DB 122 (S405). In addition, the deletion unit 104 deletes the characteristic amount of the deletion image from the characteristic amount DB 123 (S406) and deletes the similar-information list of the deletion image from the similar-information list DB 124 (S407).

Then, the deletion unit 104 deletes the image ID of the deletion image from the characteristic-amount index 125 (S408) and ends the deletion processing.

Here, the similar-information-list deletion processing in step S404 is specifically described. FIG. 13 is a flowchart for explaining the similar-information-list deletion processing.

First, the retrieval unit 105 acquires a similar image ID from the similar-information list (S501). Next, the retrieval unit 105 acquires a similar-information list corresponding to the acquired similar image ID from the similar-information list DB 124 (S502). Then, the deletion unit 104 deletes similar information having the similar information ID matching the deletion image ID from the acquired similar-information list (S503). Next, the retrieval unit 105 determines whether all the data in the similar-information list of the deletion image have been processed (S504). If all the data have not been processed (No in S504), the retrieval unit 105 acquires the next similar image ID and repeats the processing (S501).

If all the data have been processed (Yes in S504), the retrieval unit 105 ends the similar-information-list deletion processing.

Thus, the information of the deletion image is deleted using the similar-information list 124 and the characteristic-amount index 125 in the deletion processing. Accordingly, it is possible to prevent the retrieval of image data whose image file does not exist in the image-data storage unit 121 in the subsequent similarity-image retrieval processing.

Note that in the embodiment, the similar-information list DB 124 is an example of a characteristic-amount association unit, the characteristic-amount index 125 is an example of a space index management unit, the processing step S103 by the retrieval unit 105 is an example of a partial space determination unit, and each of the processing steps S105 through S111 by the retrieval unit 105 is an example of a similarity determination unit.

The present invention is not limited to the specifically disclosed embodiments, and variations and modifications may be made without departing from the scope of the present invention.

The present application is based on Japanese Priority Application No. 2007-277763 filed on Oct. 25, 2007, the entire contents of which are hereby incorporated herein by reference.

What is claimed is:

1. An information management apparatus comprising:
a processor;
a memory;
a characteristic-amount management unit that manages a characteristic amount for each piece of information;
a characteristic-amount association unit that maintains an association with a similar characteristic amount among characteristic amounts managed by the characteristic-amount management unit for each of the characteristic amounts;
a space index management unit that manages a space index for the characteristic amounts managed by the characteristic-amount management unit;
a partial space determination unit that determines a partial space in the space index to which a first characteristic amount belongs in accordance with a request for retrieving a characteristic amount similar to the first characteristic amount; and
a similarity determination unit that calculates similarity between the first characteristic amount and a second characteristic amount other than the first characteristic amount belonging to the partial space and between the first characteristic amount and a third characteristic amount associated with the second characteristic amount by the characteristic-amount association unit, and determines which characteristic amounts are similar to the first characteristic amount based on a comparison between the calculated similarity and a predetermined threshold,
wherein the partial space is the minimum unit of a characteristic amount space, and the first characteristic amount and the second characteristic amount are included in the partial space.

2. The information management apparatus according to claim 1, wherein,
when a new characteristic amount is registered in the characteristic-amount management unit, a characteristic amount similar to the new characteristic amount among the characteristic amounts managed by the characteristic-amount management unit is determined by the similarity determination unit, and an association between the new characteristic amount and the characteristic amount determined to be similar to the new characteristic amount is maintained in the characteristic-amount association unit.

3. The information management apparatus according to claim 1, wherein:
the third characteristic amount is outside of the partial space.

4. The information management apparatus according to claim 1, wherein:
the third characteristic amount is within a predetermined threshold of the second characteristic amount.

5. The information management apparatus according to claim 1, wherein:
the third characteristic amount is within a predetermined threshold of the second characteristic amount.

6. The information management apparatus according to claim 1, wherein
the similarity determination unit recursively acquires the characteristic amounts based on the association by the characteristic-amount association unit, calculates the similarity between the first characteristic amount and the acquired characteristic amounts, and determines which characteristic amounts are similar to the first characteristic amount in accordance with the comparison between the calculated similarity and the predetermined threshold.

7. The information management apparatus according to claim 6, wherein
the similarity determination unit ends recursive processing if there is no characteristic amount determined to be similar to the first characteristic amount among the characteristic amounts acquired at one time during the recursive processing based on the association by the characteristic-amount association unit.

8. The information management apparatus according to claim 6, wherein
the similarity determination unit ends recursive processing when the recursive processing is performed for a predetermined number of times during the recursive processing based on the association by the characteristic-amount association unit.

9. The information management apparatus according to claim 6, wherein
the similarity determination unit ends recursive processing when a status, where no characteristic amount determined to be similar to the first characteristic amount among the characteristic amounts acquired at one time during the recursive processing based on the association by the characteristic-amount association unit, is generated for a predetermined number of times.

10. The information management apparatus according to claim 6, wherein
the similarity determination unit ends recursive processing when a status, where no characteristic amount determined to be similar to the first characteristic amount among the characteristic amounts acquired at one time during the recursive processing based on the association by the characteristic-amount association unit, is continued for a predetermined number of times.

11. The information management apparatus according to claim 6, wherein,
when a new characteristic amount is registered in the characteristic-amount management unit, a characteristic amount similar to the new characteristic amount among the characteristic amounts managed by the characteristic-amount management unit is determined by the similarity determination unit, and an association between the new characteristic amount and the characteristic amount determined to be similar to the new characteristic amount is maintained in the characteristic-amount association unit.

12. An information management method executed by a computer having a characteristic-amount management unit that manages a characteristic amount for each piece of information, a characteristic-amount association unit that maintains an association with a similar characteristic amount among characteristic amounts managed by the characteristic-amount management unit for each of the characteristic amounts, and a space index management unit that manages a space index for the characteristic amounts managed by the characteristic-amount management unit, the information management method comprising:
a partial space determination step of determining a partial space in the space index to which a first characteristic amount belongs in accordance with a request for retrieving a characteristic amount similar to the first characteristic amount; and a similarity determination step of calculating similarity between the first characteristic amount and a second characteristic amount other than the first characteristic amount belonging to the partial space and between the first characteristic amount and a third characteristic amount associated with the second characteristic amount by the characteristic-amount association unit, and determining which characteristic amounts are similar to the first characteristic amount based on a comparison between the calculated similarity and a predetermined threshold, wherein the partial space is the minimum unit of a characteristic amount space, and the first characteristic amount and the second characteristic amount are included in the partial space.

13. A non-transitory computer readable medium storing a program which causes a computer to perform the information management method according to claim 12.

14. The information management method according to claim 12, wherein:
the third characteristic amount is outside of the partial space.

15. The information management method according to claim 12, wherein:
the third characteristic amount is within a predetermined threshold of the second characteristic amount.

16. The information management method according to claim 12, wherein:
the third characteristic amount is within a predetermined threshold of the second characteristic amount.

17. The information management method according to claim 12, wherein,
when a new characteristic amount is registered in the characteristic-amount management unit, a characteristic amount similar to the new characteristic amount among the characteristic amounts managed by the characteristic-amount management unit is determined by the similarity determination step, and an association between the new characteristic amount and the characteristic amount determined to be similar to the new characteristic amount is maintained in the characteristic-amount association unit.

18. A non-transitory computer readable medium storing a program which causes a computer to perform the information management method according to claim 17.

19. The information management method according to claim 12, wherein
in the similarity determination step, the characteristic amounts are recursively acquired based on the association by the characteristic-amount association unit, the similarity between the first characteristic amount and the acquired characteristic amounts is calculated, and the characteristic amount similar to the first characteristic amount is determined in accordance with the comparison between the calculated similarity and the predetermined threshold.

20. The information management method according to claim 19, wherein
in the similarity determination step, recursive processing is ended if there is no characteristic amount determined to be similar to the first characteristic amount among the characteristic amounts acquired at one time during the recursive processing based on the association by the characteristic-amount association unit.

21. The information management method according to claim 19, wherein
in the similarity determination step, recursive processing is ended when the recursive processing is performed for a predetermined number of times during the recursive processing based on the association by the characteristic-amount association unit.

22. The information management method according to claim 19, wherein
in the similarity determination step, recursive processing is ended when a status, where no characteristic amount determined to be similar to the first characteristic amount among the characteristic amounts acquired at one time during the recursive processing based on the association by the characteristic-amount association unit, is generated for a predetermined number of times.

23. The information management method according to claim 19, wherein
in the similarity determination step, recursive processing is ended when a status, where no characteristic amount determined to be similar to the first characteristic amount among the characteristic amounts acquired at one time during the recursive processing based on the association by the characteristic-amount association unit, is continued for a predetermined number of times.

24. A non-transitory computer readable medium storing a program which causes a computer to perform the information management method according to claim 19.

25. The information management method according to claim 19, wherein,
when a new characteristic amount is registered in the characteristic-amount management unit, a characteristic amount similar to the new characteristic amount among the characteristic amounts managed by the characteristic-amount management unit is determined by the similarity determination step, and an association between the new characteristic amount and the characteristic amount determined to be similar to the new characteristic amount is maintained in the characteristic-amount association unit.

26. A non-transitory computer readable medium storing a program which causes a computer to perform the information management method according to claim 25.

* * * * *